US006990800B2

(12) United States Patent
van Nieuwstadt et al.

(10) Patent No.: US 6,990,800 B2
(45) Date of Patent: Jan. 31, 2006

(54) DIESEL AFTERTREATMENT SYSTEMS

(75) Inventors: Michiel van Nieuwstadt, Ann Arbor, MI (US); Michele Reichenbach, Troy, MI (US); Fumin Yuan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 10/717,120

(22) Filed: Nov. 19, 2003

(65) Prior Publication Data

US 2005/0102998 A1 May 19, 2005

(51) Int. Cl.
*F10N 3/00* (2006.01)
(52) U.S. Cl. ............................ 60/277; 60/274; 60/286; 60/297; 60/301
(58) Field of Classification Search ................. 60/274, 60/276, 277, 286, 295, 297, 301, 303
See application file for complete search history.

(56) References Cited

U.S. PATENT DOCUMENTS

| | | | | |
|---|---|---|---|---|
| 5,628,186 A | * | 5/1997 | Schmelz | 60/274 |
| 5,842,341 A | * | 12/1998 | Kibe | 60/274 |
| 5,938,715 A | | 8/1999 | Zhang et al. | |
| 6,119,448 A | * | 9/2000 | Emmerling et al. | 60/274 |
| 6,145,302 A | | 11/2000 | Zhang et al. | |
| 6,199,374 B1 | * | 3/2001 | Hirota et al. | 60/277 |
| 6,408,616 B1 | * | 6/2002 | Mazur et al. | 60/277 |
| 6,742,330 B2 | * | 6/2004 | Genderen | 60/286 |

* cited by examiner

*Primary Examiner*—Binh Q. Tran
(74) *Attorney, Agent, or Firm*—Julia Voutyras; Allan J. Lippa

(57) ABSTRACT

An accurate thermodynamic model of an Active Lean NOx (ALNC) Catalyst is presented. The model takes into account hydrocarbon storage and release mechanisms of the ALNC, as well as the degradation in the ALNC hydrocarbon conversion efficiency due to ageing, and thus provides a more accurate estimate of an exotherm generated by hydrocarbon combustion in the ALNC. The estimated exotherm can them be used to detect system degradation and identify components responsible for the degradation.

6 Claims, 5 Drawing Sheets

DIESEL AFTERTREATMENT SYSTEMS

FIELD OF INVENTION

The present invention relates to a system and a method for monitoring performance of a lean exhaust gas aftertreatment system, and more particularly to using an energy-based monitor to diagnose system degradation and identify the component responsible.

BACKGROUND OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into unregulated exhaust gases. Vehicles equipped with diesel or lean gasoline engines offer the benefits of increased fuel economy. Such vehicles are typically equipped with lean exhaust gas aftertreatment devices, such as, for example, Active Lean NOx (ALNC) Catalysts, which are capable of continuously reducing NOx emissions in an oxygen rich environment. In order to maximize NOx reduction in the ALNC, a hydrocarbon-based reductant, such as fuel, is introduced into the exhaust gas entering the device via a reductant injection system. Once the ALNC has reached certain operating temperatures, further injection of reductant will create an exothermic reaction in the ALNC and thus cause its temperature to rise. As the ALNC ages, its efficiency reduces. The reduction in efficiency results in a reduction of a temperature rise, or exotherm, across the ALNC as compared to an exotherm for a non-degraded catalyst. It is therefore possible to diagnose degradation of the ALNC by monitoring the exotherm generated as a result of hydrocarbon combustion.

One such system is described in U.S. Pat. No. 5,938,715, wherein catalytic exotherm is calculated using a thermodynamic model of the catalyst. The calculated exotherm is then compared to an expected exotherm value in order to determine conversion efficiency of the catalyst.

The inventors herein have recognized a disadvantage with the prior art approach. Namely, prior art teaches modeling catalyst behavior only at steady-state, therefore any variations due to transient conditions are not accounted for. Further, a typical ALNC catalyst has a certain amount of hydrocarbon storage capacity. Hydrocarbons in the exhaust gas entering the ALNC are stored at lower temperatures, and are released as ALNC temperature increases. The released hydrocarbons combust in the ALNC and can cause temperature elevations in addition to the elevation caused by external reductant injection. Therefore, the inventors have determined that it is crucial to account for hydrocarbon storage and release mechanisms in the ALNC in order to accurately estimate the exotherm across the ALNC. Further, as the catalyst ages, its hydrocarbon conversion efficiency degrades. Thus, it is also important that the exotherm calculations account for reduced hydrocarbon conversion efficiency due to ageing.

Additionally, the inventors have recognized that at some operating conditions, such as at engine idle, the magnitude of the exotherm is so small, that in order to minimize the effect of various noise factors on the diagnostic accuracy, the exotherm may need to be increased through extra reductant injection.

SUMMARY OF THE INVENTION

Accordingly, the present invention is directed to a method for diagnosing degradation of a NOx-reducing catalyst, comprising: calculating an actual exotherm across the catalyst based on temperature measurements upstream and downstream of the catalyst; calculating an expected exotherm across the catalyst based at least on an amount of reductant stored in the catalyst and an amount of reductant in an exhaust gas mixture entering the catalyst; and providing an indication of degradation based on a comparison of said actual exotherm and said expected exotherm.

In another aspect of the present invention, a method for estimating a temperature of an active lean NOx (ALNC) catalyst, comprising: estimating an amount of reductant stored in the ALNC; and estimating the ALNC temperature based at least on said estimated amount of reductant stored in the ALNC and on an amount of reductant in an exhaust gas mixture entering the ALNC.

In yet another embodiment of the present invention, a method for estimating an exotherm across a NOx-reducing catalyst coupled downstream of an internal combustion engine, includes: providing an indication that the catalyst temperature is above light-off; in response to said indication, increasing reductant injection into the catalyst by a predetermined amount; and calculating an expected exotherm based on said predetermined increased reductant injection amount and on an amount of reductant stored in the catalyst.

The present invention provides a number of advantages. In particular, a more accurate thermodynamic model of a NOx-reducing catalyst is developed by accounting for its hydrocarbon storage and release capabilities as well as by taking into effect catalyst ageing. Therefore, improved system diagnostics is achieved through the use of a more accurate model. Also, increasing the magnitude of the exotherm through extra reductant injection further improves diagnostic accuracy by minimizing the effect of transients.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1A:
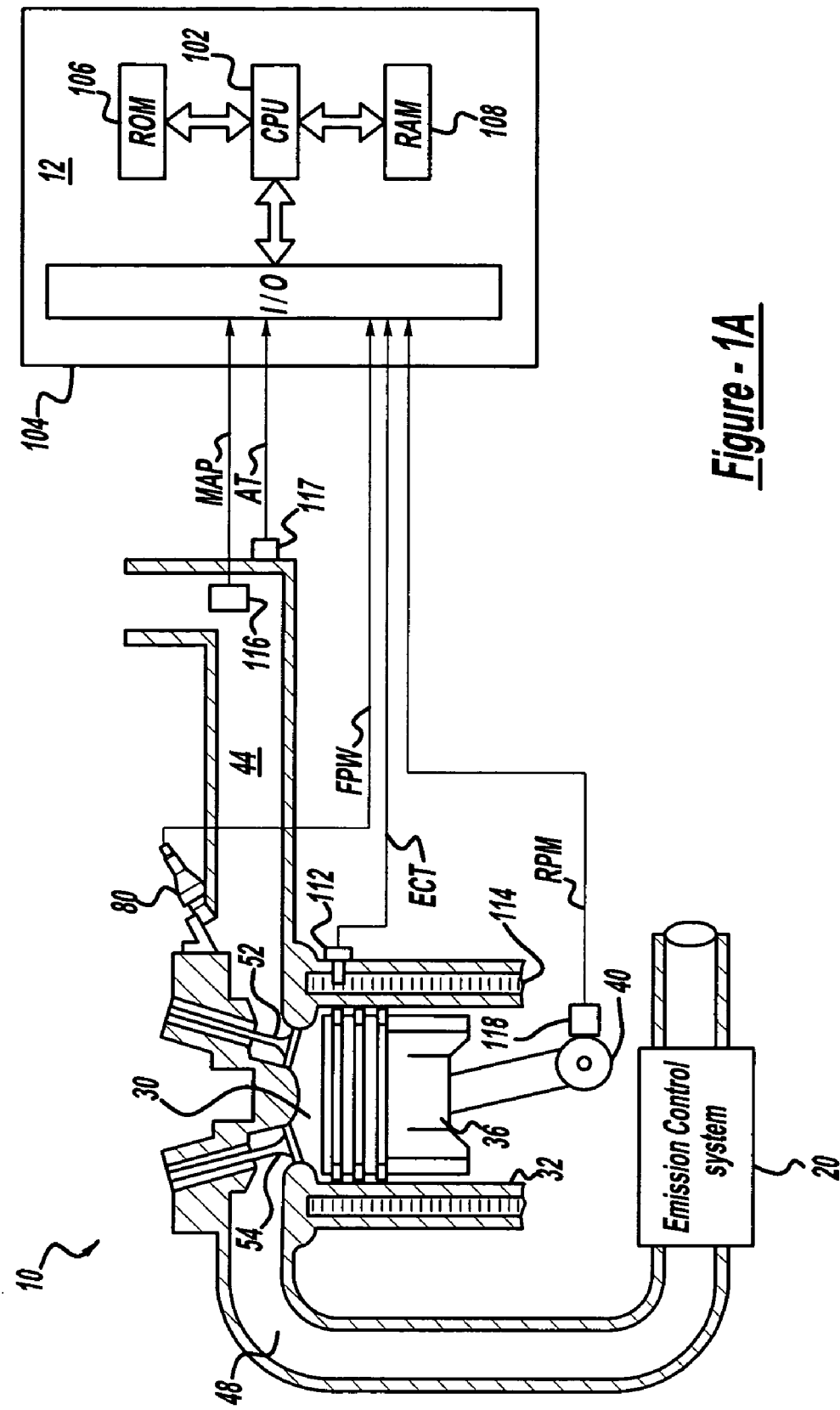
FIG. 1A and 1B are schematic diagrams of an engine wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown) including a fuel tank, fuel pump, and fuel rail (not shown).

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

An emission control system 20 is coupled to an exhaust manifold 48 and is described in more detail in FIG. 2 below.

Figure 1B:
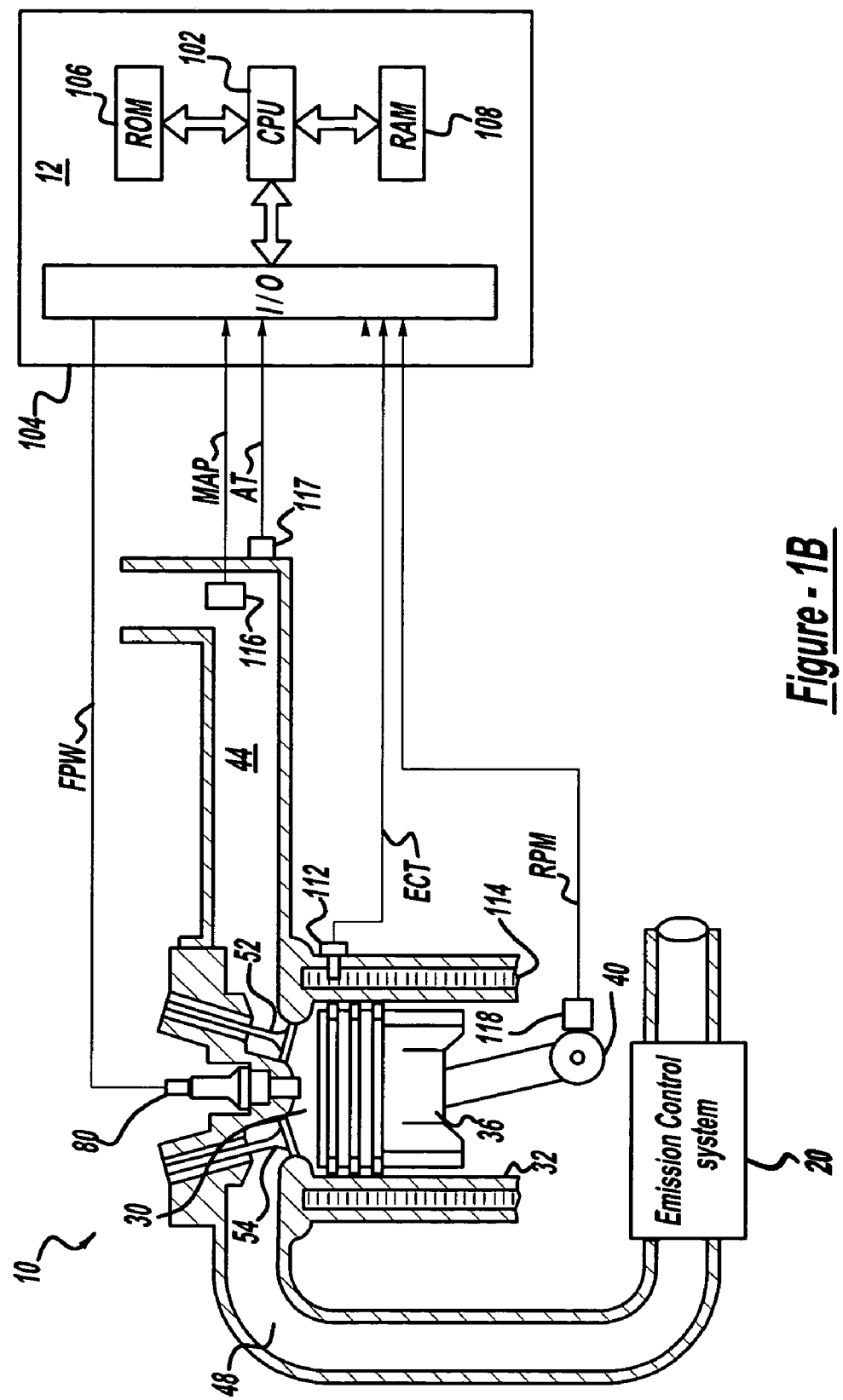

Referring now to FIG. 1B, an alternative embodiment is shown where engine 10 is a direct injection engine with injector 80 located to inject fuel directly into cylinder 30.

Figure 2:
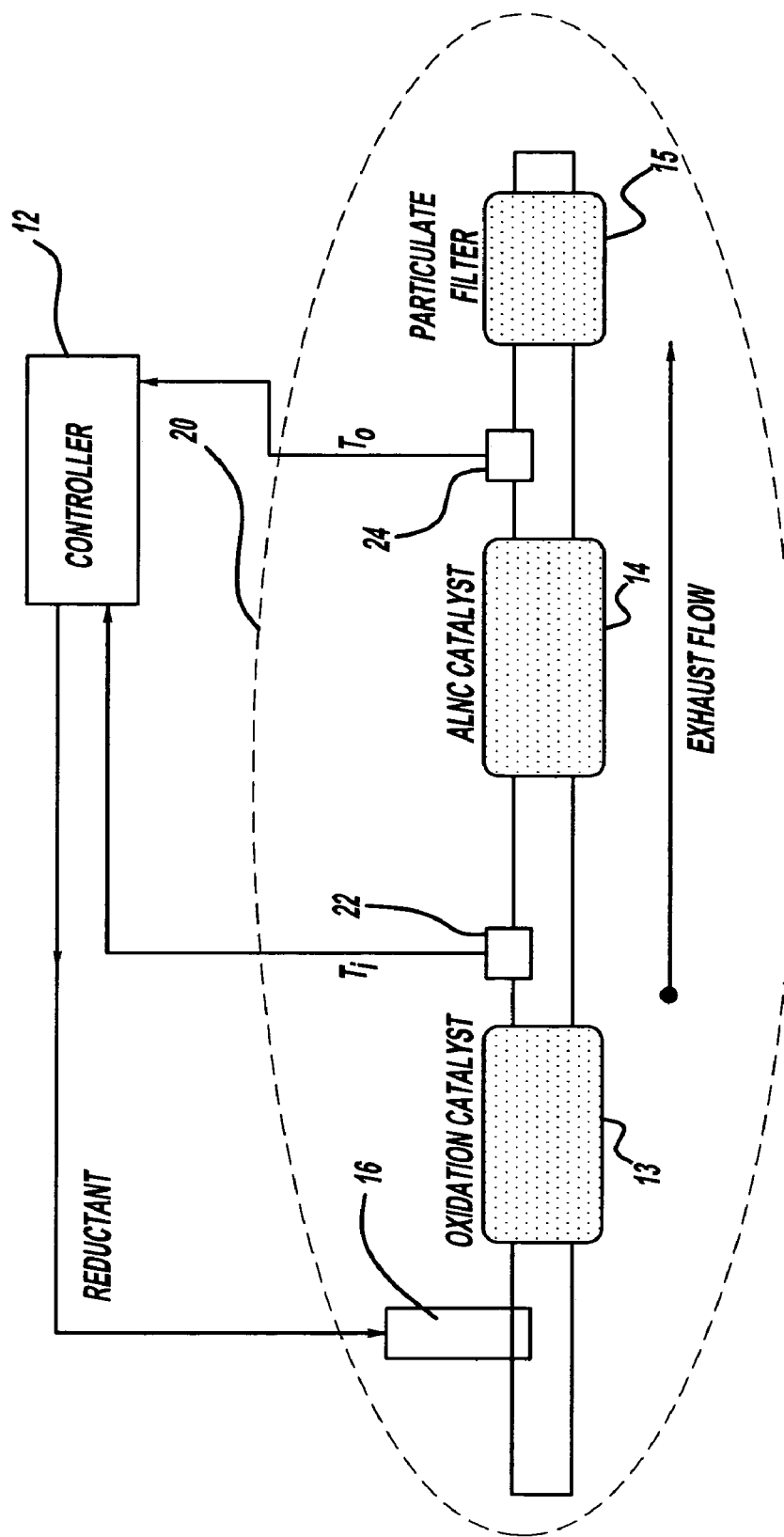
FIG. 2 is a schematic diagram of an example of an emission control system in accordance with the present invention.

Referring now to FIG. 2, an example of an emission control system 20 in accordance with the present invention is described. A first oxidation catalyst 13 is coupled to the exhaust manifold 48 downstream of engine 10 and may be a precious metal catalyst, preferably one containing platinum. Catalyst 14, a NOx-reducing catalyst capable of reducing NOx in an oxygen rich environment, is coupled downstream of the oxidation catalyst. In a preferred embodiment Catalyst 14 is an Active Lean NOx Catalyst (ALNC) comprising a precious metal or a combination of precious metals, such as Platinum or Palladium, an acidic support material, such as the one containing alumina and silica, and a zeolite material. Alternatively, catalyst 14 may be a second oxidation catalyst coupled downstream of the oxidation catalyst 13. Reductant, such as fuel (HC), is delivered from the fuel tank or a storage vessel via injector 16 coupled upstream of the first oxidation catalyst 13. Controller 12 supplies a control signal to injector 16 thereby adjusting an amount of reductant introduced into the exhaust gas stream entering catalyst 14. Alternatively, reductant injector 16 may be coupled between catalyst 13 and 14 (not shown).

Exhaust gas temperature measurements upstream, $T_{in\_meas}$, and downstream, $T_{out\_meas}$, of the ALNC are provided to the controller 12 by the temperature sensors 22 and 24 respectively. Alternatively, upstream temperature sensor 22 can be eliminated and the temperature at the ALNC inlet can be estimated based on engine speed, load, exhaust gas temperature or any other parameter known to those skilled in the art. Additionally, particulate filter 15 is coupled downstream of the ALNC to store carbon particles from the exhaust.

Once the ALNC reaches light-off temperature, combustion of hydrocarbons in the device causes a temperature rise, or exotherm, across the catalyst. Controller 12 calculates the expected exotherm across the ALNC based on a thermodynamic model of the device. Active Lean NOx catalysts contain compounds, such as zeolites, that have significant hydrocarbon storage capabilities. Some of the hydrocarbons stored in the device at lower operating temperatures get released as temperatures increase, thus increasing the exotherm beyond that generated by the instantaneous amounts of reductant entering the ALNC in the exhaust gas mixture. Thus, in order to accurately estimate the exotherm across the ALNC, it is important to account for the extra exotherm generated by the combustion of released hydrocarbons. In other words, an accurate thermodynamic model of the ALNC needs to include its hydrocarbon storage and release mechanisms. In accordance with one exemplar embodiment of the present invention, the estimated exotherm across the ALNC can be determined as a function of the estimated temperature downstream of the ALNC, T, and the measured temperature upstream of the ALNC, $T_{in\_meas}$:

$$E_{est} = f(T - T_{in\_meas})$$

T can be estimated based on a thermodynamic model of the ALNC described by the following equations:

$$\frac{d}{dt}(c_{substrate}m_{cat}T + c_{gas}m_{gas}T) = c_p W(T_{in} - T) + \quad (1)$$
$$h_t A_{ext}(T_{amb} - T) +$$
$$(W_{HC} \cdot f_{burn}(T) +$$
$$f_{rel}(T) \cdot HC_{st}) \cdot Q_{lhv}$$

$$\frac{d}{dt}HC_{st} = (1 - f_{burn}(T)) \cdot W_{HC} - f_{rel}(T) \cdot HC_{st} \quad (2)$$

In other words, the increase in internal energy of the catalyst (wherein $c_{substrate}$ is the heat capacity of the ALNC substrate, $m_{cat}$ is the mass of the catalyst,

is the heat capacity of the exhaust gas, and $m_{gas}$ is the mass of the exhaust gas in the catalyst) is equal to the energy flowing in with the inlet gas (wherein $c_p$ is the heat capacity of air at constant pressure, W is the total exhaust flow into the catalyst, and $T_{in}$ is the temperature of inlet gas) minus the energy flowing out with the exhaust gas (product of $c_p$, W and T) plus the energy rejected to the environment (wherein $h_t$ is the convective heat transfer coefficient of the catalyst, $A_{ext}$ is the catalyst area exposed to the environment, and $T_{amb}$ is the ambient temperature) plus the energy generated by reductant combustion (wherein $W_{HC}$ is hydrocarbon flow transported with the feedgas, $f_{burn}(T)$ is the hydrocarbon conversion efficiency of the catalyst (fraction of hydrocarbons burned), and $Q_{lhv}$ is the heat contained in a unit mass of fuel) plus the energy generated by the hydrocarbons released from the catalyst (wherein $f_{rel}(T)$ is the HC released and subsequently oxidized, and $HC_{st}$ is the amount of hydrocarbons stored in the catalyst.)

Figure 3:
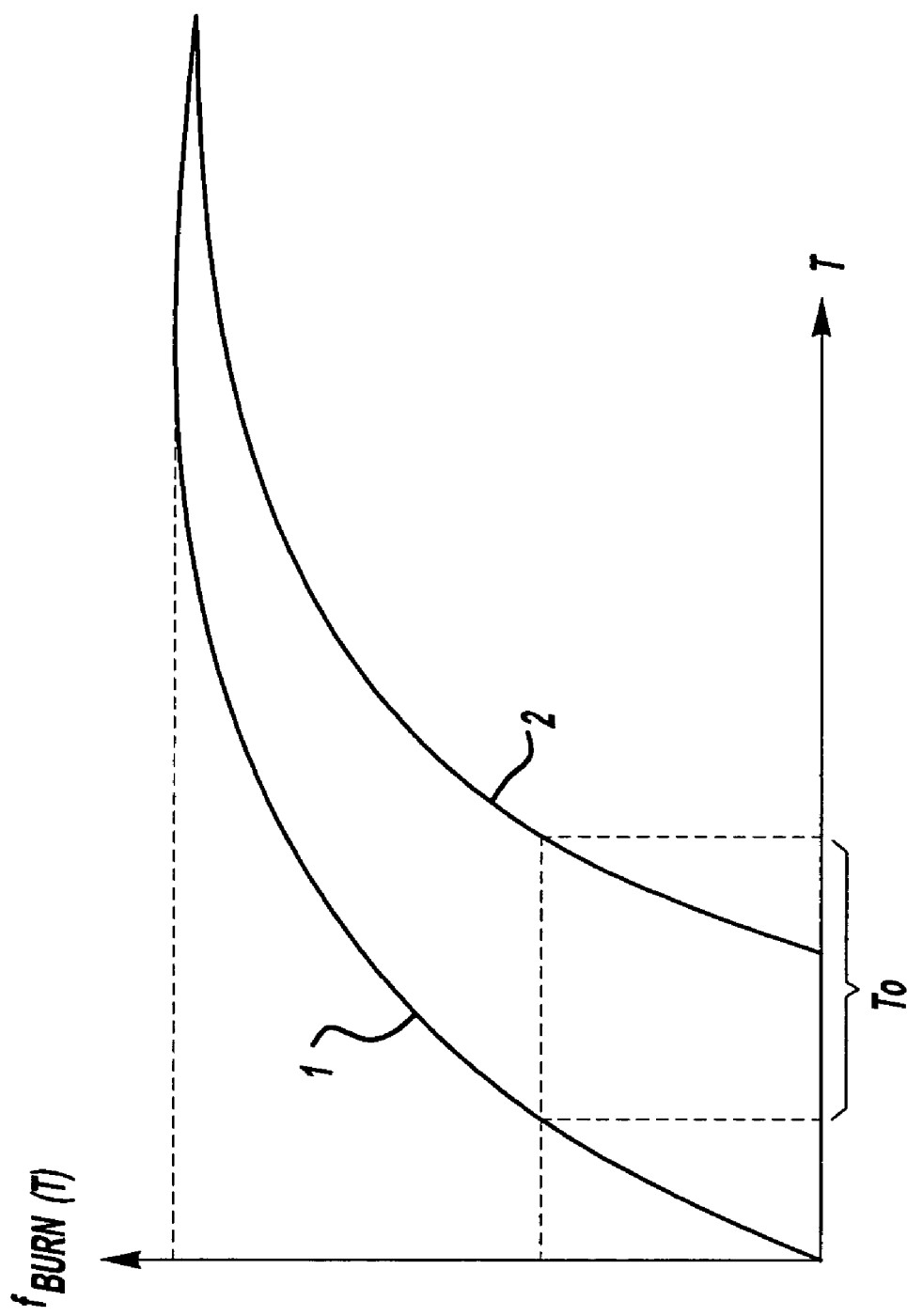
FIG. 3 is a plot of the effects of ageing on the hydrocarbon conversion efficiency of the catalyst.

The function $f_{burn}(T)$ may be a prestored curve, which is zero at low temperatures and 1 at high temperatures. However, the inventors herein have realized that, as the catalyst ages, its hydrocarbon conversion efficiency degrades, and the nominal curve becomes less representative of the actual fraction of hydrocarbons burned as a function of catalyst temperatures. FIG. 3 depicts the effects of ageing on $f_{burn}(T)$. Curve 1 depicts an exemplary hydrocarbon conversion efficiency of a fresh catalyst, while curve 2 depicts an exemplary hydrocarbon conversion efficiency of the same catalyst as it ages. Typically, the effect of ageing manifests itself in the shift of the efficiency curve to the right (i.e., as the catalyst ages, higher temperatures are required to achieve same conversion efficiency). This shift will, in turn, affect the exotherm generated across the device by reductant combustion. Therefore, rather than using a nominal hydrocarbon efficiency curve, in order to more accurately diagnose degradation of the catalyst, it is advantageous to account for the above described shift due to catalyst ageing.

The ageing of the catalyst can then be determined by estimating the shift in the hydrocarbon conversion efficiency curve. Further, since catalyst ageing has the most effect at temperatures around light-off, the inventors have determined that it is most advantageous to estimate the shift in $f_{burn}(T)$ during that period. A variety of estimation algorithms can be used. For example, equation (1) above can be expressed as:

$$a_1 \frac{d(T)}{dt} = F(T) + G(T) \cdot f_{burn}(T) \cdot W_{HC}$$

for appropriate $a_1$, F and G.

Approximating $$\frac{d(T)}{dt}$$

by its low pass filtered derivative:

$$\hat{T} = \frac{s}{\tau \cdot (s+1)} \cdot T$$

(where s is the Laplace variable) yields:

$$f_{burn}(T) = \frac{a_1 \hat{T} - F(T)}{G(T) \cdot W_{HC}}$$

Therefore, by performing this calculation the system is effectively inverted in order to calculate the input from the output.

Additionally, the ageing effects can be modeled as follows:

$$a_1 \frac{d(T)}{dt} = F(T) + G(T) \cdot f_{burn}(T - T_o) \cdot W_{HC}$$

where $T_o$ models the shift to higher temperatures due to ageing. A fresh catalyst would have $T_o$ equal to zero, whereas an aged catalyst would have $T_o$ greater than zero. The problem of estimating the catalyst age is then the problem of estimating the shift $T_o$, which can be executed by a number of ways common to the theory of parameter estimation. One such way is to augment the system above by the equation:

$$\frac{d(T_o)}{dt} = 0$$

and then to apply a Kalman filter or any other state estimation technique. Any method of estimating an input or parameter based on a system model such as presented above or otherwise can be used to implement this invention.

Therefore, in accordance with the present invention, an accurate estimate of the exotherm across the ALNC can be calculated by including hydrocarbon storage and release characteristics in the thermodynamic model of the catalyst. Further accuracy can be achieved by adjusting the model to account for reduction in hydrocarbon conversion efficiency due to catalyst ageing.

Proceeding now with FIG. 2, controller 12 produces a control signal to control the amount of reductant (such as fuel) to be supplied to the ALNC via injector 16. The control signal is based on a nominal portion that is a function of a plurality of operating parameters (for example, engine speed, engine load, EGR level, start of fuel injection (SOI), ALNC substrate temperature and space velocity (SV)) and on an adjustment portion, which is based on a comparison of estimated and measured exotherm across the ALNC (described with particular reference to FIG. 4).

As will be appreciated by one of ordinary skill in the art, the routine described in FIG. 4 below may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Figure 4:
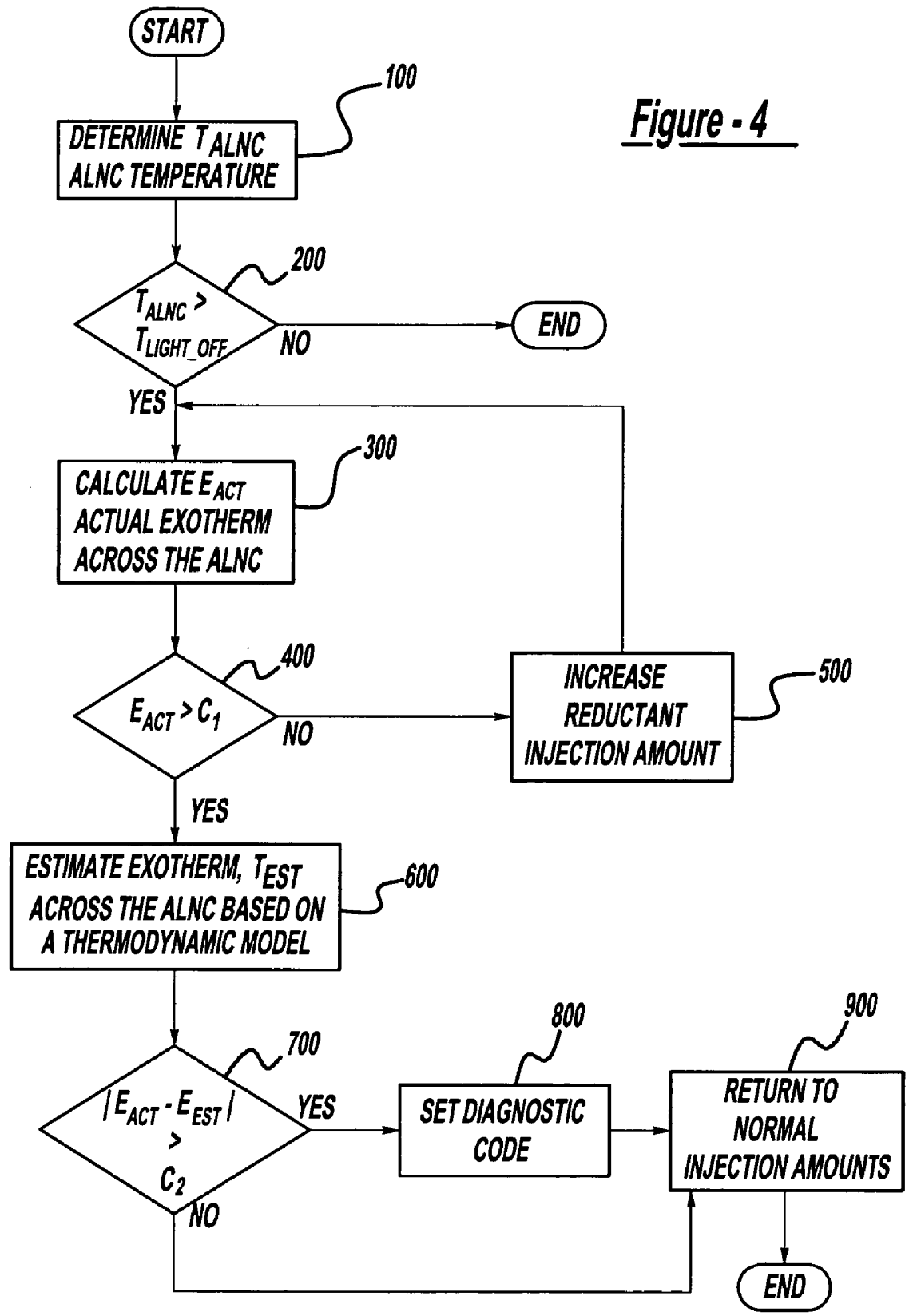
FIG. 4 is a high level flowchart of an exemplary routine detecting degradation in an emission control system in accordance with the present invention.

Referring now to FIG. 4, a routine for diagnosing deterioration in the emission control system is described. First, in step 100 ALNC temperature is estimated based on the temperature measurements upstream and downstream of the ALNC:

$$T_{ALNC} = f(T_{in\_meas}, T_{out\_meas})$$

Alternatively, ALNC temperature may be measured directly by placing a temperature sensor in the catalyst brick. In a preferred embodiment, the diagnostic routine does not proceed until the ALNC temperature is above light-off thus ensuring combustion of all of the hydrocarbons in the device. Therefore, in step 200, a determination is made whether the ALNC temperature is greater than light-off temperature, $T_{light-off}$. If the answer to step 200 is NO, the routine exits. If the answer to step 200 is YES, the routine proceeds to step 300 wherein actual exotherm across the ALNC is calculated as a function of measured temperatures upstream and downstream of the ALNC:

$$E_{act} = f(T_{out\_meas}, T_{in\_meas})$$

Next, in step 400, a determination is made whether $E_{act}$ is greater than a first predetermined threshold, $C_1$. If the answer to step 400 is NO, indicating that the magnitude of the exotherm is too low to determine it reliably in the face of the noise factors, the routine proceeds to step 500 wherein the controller increases the amount of reductant injection until the actual exotherm reaches the desired level. If the answer to step 400 is YES, the routine proceeds to step 600 wherein the estimated exotherm across the ALNC is determined based on a thermodynamic model of the catalyst described with particular reference in FIG. 2. Next, the routine proceeds to step 700 wherein a determination is made whether the magnitude of the difference between the actual and the estimated exotherm across the ALNC exceeds a second predetermined threshold, $C_2$. If the answer to step 700 is YES, system degradation is detected. For example, if the actual exotherm is higher than expected, a determination of a leaking injector may be made. Alternatively, if the actual exotherm is lower than expected, a determination of a blocked injector or a damaged ALNC may be made. The routine then proceeds to step 800 wherein a diagnostic code is set, followed by step 900 wherein the reductant injection amount is adjusted to return to the nominal injection value. The routine then exits. If the answer to step 700 is NO, indicating no system degradation, the routine proceeds to step 900 and then exits.

In an alternative embodiment (not shown), once a determination is made that the ALNC temperature is above light-off, the amount of reductant in the exhaust gas mixture entering the catalyst may be increased by a predetermined amount. The expected incremental increase in the exotherm generated due to the increase in the amount of reductant injected may then be compared to the actual measured increase in the exotherm to diagnose system degradation. This method is especially advantageous when the magnitude of the exotherm is so low that estimate accuracy is easily affected by various noise factors, such as during low load operation.

Therefore, according to the present invention, an improved model of thermodynamic behavior of an Active Lean NOx Catalyst that accounts for its hydrocarbon storage and release mechanisms is developed. The model also includes the effects of ageing on the hydrocarbon conversion efficiency of the catalyst. The model can then be used to accurately estimate the exotherm generated across the ALNC as a result of combustion of both the injected hydrocarbons and the hydrocarbons released from the device. Further, by comparing the estimated exotherm with the measured exotherm, a determination of system degradation can be made, and also remedial measures, such as adjusting reductant injection amounts to compensate for degradation, can be taken.

This concludes the description of the invention. The reading of it by those skilled in the art would bring to mind many alterations and modifications without departing from the spirit and the scope of the invention.

Accordingly, it is intended that the scope of the invention is defined by the following claims:

The invention claimed is:

1. A method for estimating an exotherm across a NOx-reducing catalyst coupled downstream of an internal combustion engine, comprising:
   providing an indication that a catalyst temperature is above light-off;
   in response to said indication, increasing reductant injection into the catalyst by a predetermined amount; and
   calculating an expected exotherm based on said predetermined increased reductant injection amount and on an amount of reductant stored in the catalyst.

2. The method as set forth in claim 1 wherein the NOx-reducing catalyst is an ALNC.

3. The method as set forth in claim 1 wherein the NOx-reducing catalyst is an oxidation catalyst.

4. The method as set forth in claim 1 wherein said reductant is hydrocarbon.

5. The method as set forth in claim 1 further comprising calculating an actual exotherm based on at least a temperature measurement downstream of said catalyst.

6. The method as set forth in claim 5 further comprising providing an indication of catalyst degradation an based on a comparison of said actual and said expected change in said exotherm.

\* \* \* \* \*